United States Patent [19]

Brown et al.

[11] Patent Number: 4,602,898
[45] Date of Patent: Jul. 29, 1986

[54] DOWEL DRILLING JIG

[75] Inventors: Geoff Brown, Royal Leamington, Great Britain; Hartmut Zimmermann, La Celle St. Cyr, France

[73] Assignee: Robert Wolff, Fed. Rep. of Germany

[21] Appl. No.: 629,041

[22] Filed: Jul. 9, 1984

[30] Foreign Application Priority Data

Oct. 27, 1983 [DE] Fed. Rep. of Germany ....... 3338912

[51] Int. Cl.⁴ .............................................. B23B 49/02
[52] U.S. Cl. .............................. 408/115 R; 408/72 R
[58] Field of Search ............... 408/115 R, 72 R, 72 B, 408/241 G, 241 B, 115 B; 33/185 R, 185, 174.6

[56] References Cited

U.S. PATENT DOCUMENTS

| 3,914,871 | 10/1975 | Wolff | 408/115 R X |
| 4,145,160 | 3/1979 | Wiggins | 408/115 R X |
| 4,176,989 | 12/1979 | Wolff | 408/115 R |
| 4,377,357 | 3/1983 | Butera | 408/115 R |

FOREIGN PATENT DOCUMENTS

| 3105180 | 12/1981 | Fed. Rep. of Germany ... | 408/115 R |
| 2071537 | 9/1981 | United Kingdom ............ | 408/115 R |

Primary Examiner—William R. Briggs
Attorney, Agent, or Firm—Antonelli, Terry & Wands

[57] ABSTRACT

A jig for mounting workpieces which are to be doweled together, with the jig including two workpiece receiving spaces disposed one above the other and separated by a spacer member. Flat sides of the workpieces are adapted to be clamped against the spacer member with front edge surfaces thereof being brought into abutment with a base plate of the jig. At least one drill accommodating hole communicates with the receiving spaces for the workpieces for enabling of a drill accommodating hole in the workpieces. At least one additional drill hole, communicating with the other workpiece receiving space is provided in the base plate at the same distance from the spacer member as the first drill accommodating hole and in the same vertical plane so as to enable the use of the jig for a front to front side doweling of the workpieces. A convertible clamping device may be provided for clamping an upper workpiece, with the clamping device being selectively disposed either at the spacer member or the base plate thereby enabling the workpiece to be either horizontally or vertically fixed in the workpiece receiving space.

7 Claims, 6 Drawing Figures

DOWEL DRILLING JIG

The present invention relates to a jig and, more particularly, to a jig for enabling a drilling in two plates, boards, or similar workpieces which are adapted to be doweled together, with the jig including two workpiece receiving spaces disposed one above the other and separated by a spacer member, branching from a base member at a right angle thereto, against which the workpieces can be tightly clamped on one of their flat sides, the front edge surfaces thereof being coincidentally brought into abutment with the base member, and with at least one drill accommodating hole being provided in the base member and comunicating with one of the workpiece receiving spaces for enabling a formation of dowel accommodating holes in the workpieces.

In, for example, German Patent No. 24 37 724, a jig for dowel drilling is proposed which includes a twin screw clamp arrangement wherein one of two plates, boards, or similar workpieces is horizontally fixed and the other of the two plates, boards, or similar workpieces is vertically fixed, whereby, by drilling guide holes in the two workpieces, associated pairs of dowel holes are formed which accommodate pins or the like. While this proposed drilling jig considerably facilitates an exact placing of the dowel holes, a disadvantage resides in the fact that the jig is exclusively qualified for placing dowel holes in situations wherein a front side of one of the workpieces is disposed on a flat side of the other workpiece.

In, for example, German Offenlegungsschrift No. 3,105,180, a further drilling jig is proposed which includes two receiving spaces for accommodating workpieces which are disposed one above the other and separated by a spacer member branched at a right angle from a base plate. The two workpieces to be doweled can, on their flat sides and front edge surfaces thereof, be brought into abutment with the base plate and spacer member and be fixedly clamped. The base member is provided with at least one drill accommodating hole communicating with one of the workpiece receiving spaces for enabling a formation of a dowel accommodating hole in the workpieces. A disadvantage of this proposed construction resides in the fact that the jig is exclusively suitable only for a front on flat side doweling.

As can readily be appreciated, in general use, a number of applications arise wherein plates, boards, or similar workpieces need to be doweled in a front edge to a front edge arrangement.

The aim underlying the present invention essentially resides in providing a dowel drilling jig which can be used for carrying out a front to front doweling of workpieces.

In accordance with advantageous features of the present invention, a drilling jig is provided wherein the base plate includes at least one further drill accommodating hole communicating with the second work receiving spaces, with the respective drill accommodating holes being disposed on opposite sides of a spacer member at a same distance therefrom and in the same vertical plane.

By virtue of the above-noted features of the present invention, two workpieces can be horizontally clamped one above the other and each of the workpieces can at front surfaces or edges thereof be provided with dowel accommodating holes. By virtue of the arrangement of the two drill accommodating holes at the same distance from the spacer member and in the same vertical plane, an accurate front to front side doweling can be carried out without complicated measures. This is especially important for front to front dowelings, because thereat a slight displacement of borders of the workpiece would result in the workpiece becoming useless.

In accordance with further features of the present invention, one of the workpiece receiving spaces may be equipped with a convertible clamping device adapted to be selectively mounted on either the spacer member or the base plate so as to enable a workpiece to be respectively either horizontally or vertically fixed in the workpiece receiving space.

By virtue of the last mentioned features of the present invention, not only is it possible to effect a front to front doweling but also a front to flat side doweling whereby the operational possibilities of the jig of the present invention are considerably expanded. Moreover, with a jig construction of this type which can be universally used, one of the two workpieces can always be horizontally clamped and a front edge can be provided with dowel accommodating holes while the other piece can be selectively tightly clamped either horizontally or vertically in the workpiece receiving space and be respectively provided with dowel accommodating holes either on a front side or a flat side thereof. In any event, in both cases, an accurate coordination of the dowel accommodating holes can easily be obtained.

In accordance with further features of the present invention, the convertible clamping device may include a clamping support member mounted in a non-rotatable way which is adapted to be fixed at the support plate or at the spacer member. The clamping support member guidably supports a threaded member such as a ferrule screw. By virtue of these features, the clamping device can readily be changed over in an easy manner from a front to front side doweling arrangement to a front to flat side doweling arrangement as is necessary by simply selectively moving the convertible clamping device from the base member to the spacer member. While the clamping support member, in a loosened condition can be simply exchanged, after a tightening of the ferrule screw, the support member receives through this clamping effect a firm support at the base member or at the spacer member.

It is also possible in accordance with the present invention to provide, for each workpiece receiving space, a plurality of drill accommodating holes which have different diameters and which are disposed in associated pairs. Through the arrangement of several drill accommodation holes which are provided with different diameters, it is possible to take into consideration conceivably all marketable size of dowels by only utilizing a single jig for all applications.

In accordance with still further features of the present invention the base plate may, at least in an area of one workpiece receiving space be constructed as a substantially planar plate provided along one edge thereof facing away from the spacer member, with a plurality of grooves for scanning or positioning dowels placed in another workpiece whereby the grooves are each in alignment with additional drill accommodating holes which lie between the grooves and the drill accommodating holes arranged near the spacer member.

The arrrangement of the grooves and additional accommodating holes is convenient for situations wherein a front to flat side doweling not a corner butt but a T-butt is to be effected. In this connection, during a first working operation, a workpiece can be provided with dowel accommodating holes along a front edge thereof with the drilling jig of the present invention, and in a second working operation the workpiece with inserted dowels may be arranged on the second workpiece with the predrilled front side edges parallel to the planned mounting direction. After this the inserted dowels can be scanned or positioned with the grooves and additional drill accommodating holes, which lie in alignment with the grooves may serve for placing further dowel accommodating holes on the flat side of the second workpiece. The drill accommodating holes which are disposed in a vicinity of the spacer member could not be used since such drill accommodating holes would lie too close to the spacer member and would therefore interfer with a working operation. However, in spite of the provision of additional grooves and drill accommodating holes for the drilling jig the drilling jig does not become substantially larger if the grooves are arranged in an area of a convertible clamping support member adaptable to be detached for the respective doweling operations to be carried out.

The above and other objects, features and advantages of the present invention will become more apparent from the following description when taken in connection with the accompanying drawings which show, for the purposes of illustration only, several embodiments in accordance with the present invention, and wherein.

Figure 1:
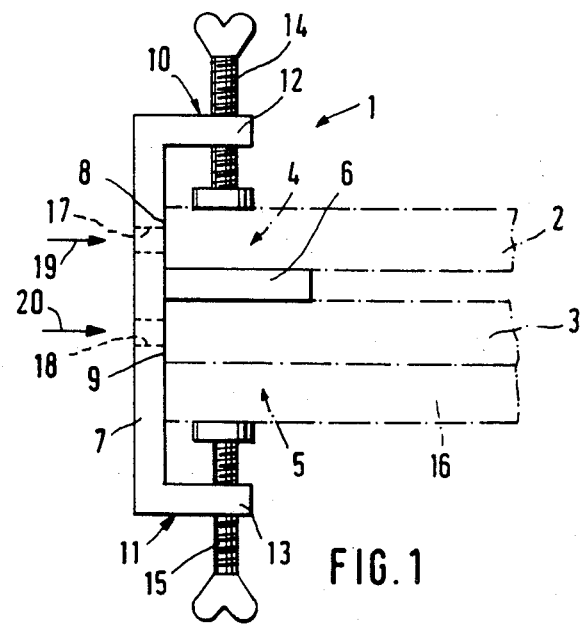
FIG. 1 is a side view of a dowel drill jig for a front to front side doweling constructed in accordance with the present invention.

Referring now to the drawings wherein like reference numerals are used throughout the various views to designate like parts and, more particularly, to FIG. 1, according to this Figure, a drilling jig generally designated by the reference numeral 1 for a front on front or butt joint doweling of two workpieces 2, 3 includes a pair of receiving spaces generally designated by the reference numerals 4, 5 for respectively accommodating the workpieces 2, 3, with the receiving spaces 4, 5 being separated from each other by a spacer member 6 branching at a right angle from a base member 7. The two workpieces 2, 3 are respectively disposed in the receiving spaces 4, 5 such that the respective front or edge surfaces 8, 9 are in abutment with the base member 7. The workpieces 2, 3 are fixedly clamped in the jig 1 by clamping means generally designated by the reference numeral 10, 11. The clamping means respectively include a stationary support member 12, 13 fixedly secured to the base member 7, with the support members 12, 13 being provided with threaded holes therein for threadably adjustably accommodating threaded fasteners 14, 15 such as screws or the like, so as to enable the workpieces 2, 3 to be clamped between an end of the respective fasteners and the spacer member 6.

Advantageously, the lower workpiece 3 is disposed on a horizontally arranged support surface 16 such as, for example, a work bench or the like and, for this purpose, a distance between the spacer member 6 and the lower support member 13 is greater than a distance between the upper support member 12 and the spacer member 6 thereby enabling the clamping device to clamp the support surface to the workpiece 3. The base member 7 is provided with at least two through holes or openings 17, 18 for accommodating drills or the like (not shown) thereby enabling dowel accommodating holes to be formed in the front or edge surfaces 8, 9 of the workpieces 2, 3, with the drills being inserted into the holes or openings 17, 18 in a direction of the arrows 19, 20. The through holes or openings 17, 18 are disposed in the base member 7 at a same distance from the spacer member 6 and in the same vertical plane so that the dowel accommodating holes in both workpieces 2, 3 will be in alignment with each other when the workpieces 2, 3 are removed from the jig 1 and the front faces or edges are brought into an aligned abutting relationship.

Figure 2:
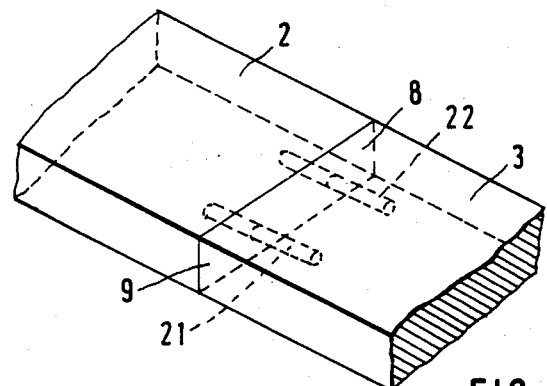
FIG. 2 is a partial perspective view of a front side doweling of two workpieces.

To form further dowel accommodating holes in the front or edge faces 8, 9 of the workpieces 2, 3, a second jig (not shown) may be clamped to the workpieces 2, 3 in the same manner described hereinabove so as to enable the drilling of further dowel accommodating holes. After an initial set of dowel accommodating holes have been formed, the clamping devices 10, 11 of the firt jig 1 are loosened and the jig 1 is removed in a longitudinal direction of the workpieces 2, 3 and can be clamped again in any distance of its initial position in order to form another set of dowel accommodating holes, the second jig remaining in a fixed position. After taking away of the jig or jigs, as shown most clearly in FIG. 2, the workpiece 2 can be turned through 180° and the front edges or surfaces 8, 9 can be accurately joined together by dowels or pins 21, 22.

Figure 3:
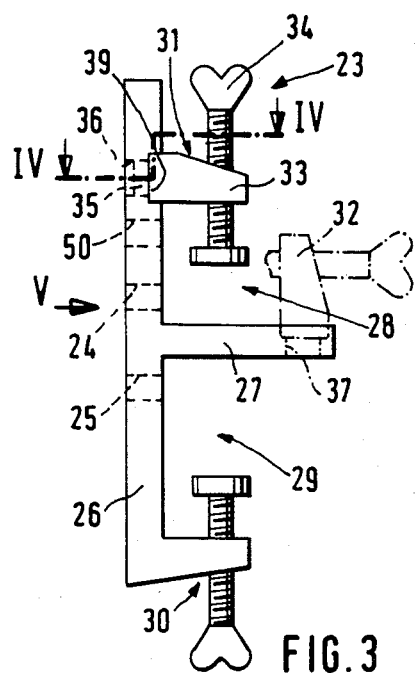
FIG. 3 is a side view of a jig constructed in accordance with another embodiment of the present invention which enables a front to front side doweling as well as a front to flat side doweling.

In FIG. 3, a drilling jig generally designated by the reference numeral 23 includes a base member 26 provided with drill accommodating holes 24, 25 and a spacer member 27 branching at a right angle from the base member 26 and separating work receiving areas generally designated by the reference numerals 28, 29. The jig 23 further includes a lower fixed clamping device generally designated by the reference numeral 30 and an adjustably mounted clamping device generally designated by the reference numeral 31. As with the embodiment of FIG. 1, the lower fixed clamping device 30 is spaced at a sufficiently large distance from the spacer member 27 so as to enable a workpiece and a supporting surface such as a work bench to be clamped together.

The upper clamping device 31 is adapted to be mounted along the base member 26 so as to permit the forming of dowel accommodating holes in the front face or edge of a workpiece through the drill accommodating hole 24 or to be mounted on the spacer member 37 so as to permit the forming of dowel accommodating holes on a flat side of the workpiece through the drill accommodating hole 24 by enabling a vertical clamping of a workpiece in the receiving space 28.

Figure 4:
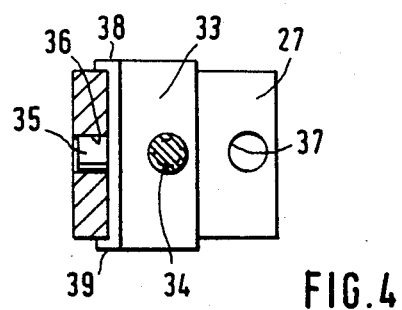
FIG. 4 is a cross-sectional view taken along the line IV—IV in FIG. 3.

As shown most clearly in FIGS. 3 and 4, the upper clamping device includes a threaded support member 33 for adjustably threadably receiving a threaded fastener 34. The support member 33 includes a journal portion 35 adapted to be received in either a journal accommodating opening 36 provided in the base member 26 or in a journal accommodating opening 37 provided in the spacer member 27. The support member 33 is provided with two lateral guide means 38, 39 which prevent the support member 33 from rotating relative to the base member 26 or the spacer member 27.

Figure 5:
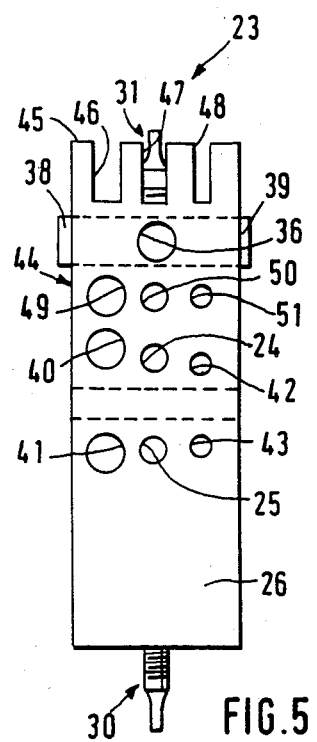
FIG. 5, is a plan view taken in the direction of the arrow V in FIG. 3.

As shown in FIG. 5, in addition to the drill accommodating holes 24, 25, it is also possible to provide a plurality of further drill accommodating holes 40, 41, 42, 43 of varying diameter which may be greater than or less than a diameter of the drill accommodating holes 24, 25, whereby it is possible to use the drill jig 23 for different classifications depending upon the size of the dowels or pins. It is understood that the provision of the additional drill accommodating holes does not alter the principal function of the drilling jig 23.

As also shown in FIG. 5, the drilling jig 23, in an area of the work receiving space 28 is fashioned as a substantially planar plate portion 44, with an end face of the planar portion, facing away from the spacer member 27, being provided with a plurality of grooves 46, 47, 48, each of which are in alignment with additional drill accommodating holes 49, 50, 51.

Figure 6:
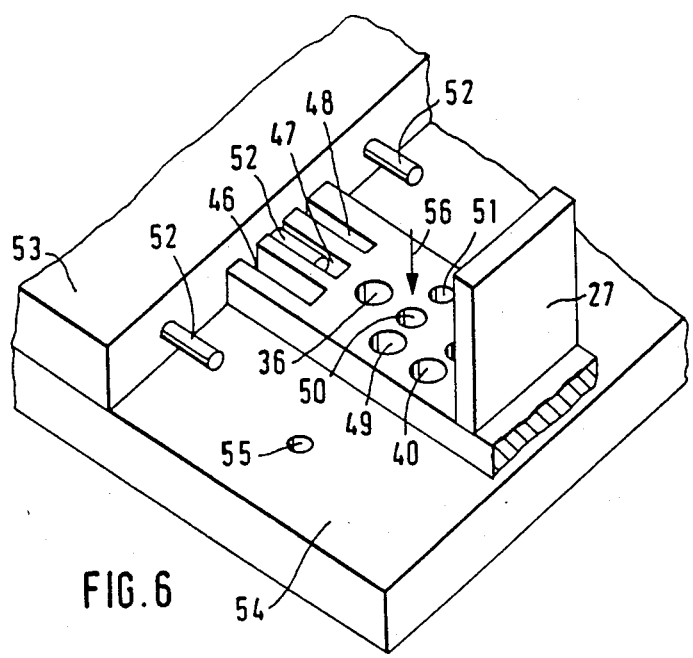
FIG. 6 is a perspective view of the jig of FIG. 5 positioned for carrying out a front to flat side T-butt doweling.

As shown most clearly in FIG. 6, the grooves 46, 47 serve to scan the positioning dowels 52 inserted in a front edge of the workpiece 53 which is lying with its flat side on a workpiece 54. By virtue of the provision of the guide grooves 46, 47, a dowel accommodating hole such as, for example, a hole corresponding to the dowel accommodating hole 55 can be formed in the flat side of the workpiece 54 whereby the holes 55 are accurately aligned with the associated dowel pins 52. In order to ensure that the spacer member 27 does not interfer with a drill inserted in the direction of the arrow 56, the additional drill accommodating holes 49, 50, 51 are positioned at a sufficient distance from the spacer member 27, that is, they lie between the grooves 46, 47, 48 and the drill accommodating holes 40, 24, 42 disposed near the spacer member 27.

While we have shown and described several embodiments in accordance with the present invention, it is understood that the same is not limited thereto but us susceptible of numerous changes and modifications as known to one having ordinary skill in the art and we therefore do not wish to be limited to the details shown and described herein, but intend to cover all such modifications as are encompassed by the scope of the appended claims.

We claim:

1. A jig for holding two workpieces which are to be doweled together, the jig comprising a base plate means, a spacer means extending from said base plate means substantially at a right angle with respect thereto for forming two workpiece receiving spaces for respectively accommodating the workpieces one above the other with a front edge of the respective workpieces being in abutment with a base plate means and a flat surface of the respective workpieces being in abutment with the spacer means, at least one first drill accommodating hole provided in the base plate means and communicating with one of the work receiving spaces, at least one second drill accommodating hole provided in the base plate means and communicating with the other work receiving space, said at least one first drill accommodating hole and said at least one second drill accommodating hole being disposed at the same distance from said spacer means and in the same vertical plane, and further comprising a convertible clamping means, said convertible clamping means including mounting means for selectively mounting said convertible clamping means on one of the base plate means and the spacer means for enabling one of the workpieces to be mounted horizontally or vertically in one of the workpiece receiving spaces.

2. A jig according to claim 1, wherein said convertible clamping means includes a workpiece support member, and wherein a threaded fastener means is mounted in the workpiece support member for enabling a clamping of the workpiece in one of the workpiece receiving spaces.

3. A jig according to claim 2, wherein a plurality of drill accommodating holes are provided in the base plate means in communication with the respective workpiece receiving spaces.

4. A jig according to claim 3, wherein the plurality of drill accommodating holes are of different diameters so as to enable an accommodation of various diameter drills.

5. A jig according to claim 1, wherein the base plate means is constructed as a substantially planar plate member at least in an area of at least one of the workpiece receiving spaces, a plurality of groove means are provided in an end area of the base plate means facing away from the spacer means for scanning positioning dowels of one of the workpieces, a plurality of additional drill accommodating holes are provided in the base plate means, said additional drill accommodating holes are respectively disposed in alignment with the groove means and are disposed between the groove means and one of the at least one first and second drill accommodating holes.

6. A jig according to claim 5, wherein said at least one first and second drill accommodating holes are disposed in an area near the spacer means.

7. A jig according to claim 4, wherein said plurality of first drill accommodating holes are of different diameters, said plurality of second drill accommodating holes are of different diameters with the diameters of the second drill accommodating holes respectively corrsponding to the diameters of the first drill accommodating holes, and wherein the first and second drill accommodating holes having the same diameter are disposed in pairs in the base plate means.

* * * * *